(12) United States Patent
Song et al.

(10) Patent No.: US 11,841,523 B2
(45) Date of Patent: Dec. 12, 2023

(54) DIFFRACTIVE OPTICAL WAVEGUIDE AND DISPLAY DEVICE

(71) Applicant: JIAXING UPHOTON OPTOELECTRONICS TECHNOLOGY CO., LTD., Zhejiang (CN)

(72) Inventors: Yuming Song, Beijing (CN); Kehan Tian, Beijing (CN)

(73) Assignee: JIAXING UPHOTON OPTOELECTRONICS TECHNOLOGY CO., LTD., Jiaxing (CN)

(*) Notice: Subject to any disclaimer, the term of this patent is extended or adjusted under 35 U.S.C. 154(b) by 0 days.

(21) Appl. No.: 18/132,982

(22) Filed: Apr. 11, 2023

(65) Prior Publication Data

US 2023/0333301 A1    Oct. 19, 2023

(30) Foreign Application Priority Data

Apr. 15, 2022   (CN) .......................... 202210399540.6

(51) Int. Cl.
  *F21V 8/00* (2006.01)
  *G02B 27/01* (2006.01)
  *G02B 27/00* (2006.01)
  *G02B 6/34* (2006.01)

(52) U.S. Cl.
  CPC ....... *G02B 6/0016* (2013.01); *G02B 27/0081* (2013.01); *G02B 27/0172* (2013.01); *G02B 6/34* (2013.01); *G02B 2027/0178* (2013.01)

(58) Field of Classification Search
  CPC ........ G02B 2027/0178; G02B 27/0172; G02B 27/0081; G02B 6/34
  See application file for complete search history.

(56) References Cited

U.S. PATENT DOCUMENTS

| 2021/0063765 | A1 | 3/2021 | Yang |
| 2022/0099990 | A1* | 3/2022 | Olkkonen ............ G02B 5/1866 |
| 2022/0206300 | A1* | 6/2022 | Park ................... G02B 27/4205 |

FOREIGN PATENT DOCUMENTS

| CN | 111240015 A | 6/2020 |
| CN | 213690000 U | 7/2021 |
| CN | 113777707 A | 12/2021 |
| CN | 215264107 U | 12/2021 |
| CN | 114296244 A | 4/2022 |

\* cited by examiner

*Primary Examiner* — Alexander P Gross
(74) *Attorney, Agent, or Firm* — BakerHostetler (57) ABSTRACT

A diffractive optical waveguide and a display device for optical pupil expansion are provided. The diffractive optical waveguide comprises a waveguide substrate; a coupling-in grating; and a coupling-out grating comprising first, second, and third coupling-out gratings that are arranged successively in a first direction. The second coupling-out grating is corresponding to a region that includes a first edge and a second edge spaced in a second direction orthogonal to the first direction. The second direction is orthogonal to the first direction. The first edge is closer to the coupling-in grating than the second edge. A first width of the first edge in the first direction is greater than a second width of the second edge in the first direction. The light output by the coupling-in grating is incident on the second coupling-out grating through the waveguide substrate, and is diffracted by the second coupling-out grating into a plurality of beam splits.

17 Claims, 7 Drawing Sheets

DIFFRACTIVE OPTICAL WAVEGUIDE AND DISPLAY DEVICE

CROSS-REFERENCE TO RELATED APPLICATION

This application claims priority to Chinese Patent Application No. 202210399540.6, filed on Apr. 15, 2022. The entire disclosure of the above-identified application is incorporated herein by reference.

BACKGROUND

The present invention generally relates to the technical field of diffractive optics, and more specifically to a diffractive optical waveguide and a display device.

With the high development of semiconductor technology, the way of interaction between human and computer is developing rapidly, and Augmented Reality (AR) display, among others, can provide multidimensional information to human beings and has been widely concerned. AR glasses are one of the important mediums in the field of augmented reality display. The diffractive optical waveguide has the advantages of allowing production with high ability for mass production and a light, thin form, and is gradually approved in the field of AR display, thereby is expected to become the mainstream technology development direction of AR field in the future. The coupling-out grating is one of the essential components of the diffractive optical waveguide.

However, the current coupling-out grating has the following problems: if intended to obtain a good two-dimensional pupil expansion effect, it is difficult to balance the coupling-out efficiency and uniformity of different regions. This means, the coupling-out efficiency of the grating gets lower when the uniformity between different regions of light output is good, and on the contrary, the uniformity between different regions of light output gets poorer when the coupling-out efficiency of the grating is high. As a result, a significant change in the brightness of the image may be observed by the human eyes moving in the eye box of the diffractive optical waveguide, and results in poor display effect as well as significantly affects the user experience. Therefore, it is necessary to improve the diffractive optical waveguide to solve at least one technical problem.

SUMMARY

The present invention is proposed to solve at least one of the above-mentioned problems. Specifically, in the first aspect of the present invention, it provides a diffractive optical waveguide for optical pupil expansion, comprising:
  a waveguide substrate;
  a coupling-in grating disposed on or in the waveguide substrate and configured to couple input light into the waveguide substrate to cause light to propagate within the waveguide substrate through total reflection;
  a coupling-out grating disposed on or in the waveguide substrate and configured to couple out at least a portion of light propagating therein from the waveguide substrate by diffraction, wherein,
  the coupling-out grating comprises a first coupling-out grating, a second coupling-out grating and a third coupling-out grating, all of which are arranged successively in a first direction; the second coupling-out grating is disposed between the first coupling-out grating and the third coupling-out grating and comprises a two-dimensional grating; the second coupling-out grating is corresponding to a region that includes a first edge and a second edge spaced in a second direction orthogonal to the first direction, wherein the first edge is closer to the coupling-in grating than the second edge, and a first width of the first edge in the first direction is greater than a second width of the second edge in the first direction; light output by the coupling-in grating is incident on the second coupling-out grating through the waveguide substrate, and is diffracted by the second coupling-out grating into a plurality of beam splits, including a first beam split propagating in the region of the second coupling-out grating and a second beam split propagating toward the first coupling-out grating or the third coupling-out grating.

Exemplarily, the coupling-in grating has a central axis parallel to the second direction; a first included angle is defined between the second edge and a line connecting respective endpoints of the first edge and the second edge of the second coupling-out grating on the same side of the central axis; a second included angle is defined between the second edge and the propagation direction of the first beam split, wherein the first included angle is greater than or equal to the second included angle.

Exemplarily, the plurality of beam splits further comprise a third beam split propagating in the same direction as the propagation direction of light output by the coupling-in grating, and the third beam split is propagable to the first coupling-out grating or the third coupling-out grating.

Exemplarily, the third beam split is diffracted into a first light component and a second light component by the first coupling-out grating, wherein the first light component propagates in the first coupling-out grating and is at least partially coupled out of the waveguide substrate, and the second light component propagates toward the second coupling-out grating for filling light; or
  the third beam split is diffracted into a first light component and a second light component by the third coupling-out grating, wherein the first light component propagates in the third coupling-out grating and is at least partially coupled out of the waveguide substrate, and the second light component propagates toward the second coupling-out grating for filling light.

Exemplarily, the first width of the first edge is configured so that periphery field-of-view light in the field of view formed by the light output from the coupling-in grating is able to be incident into the second coupling-out grating through total reflection by the waveguide substrate.

Exemplarily, a first field-of-view angle is defined as an included angle between the periphery field-of-view light and the central axis of the coupling-in grating, and the central axis of the coupling-in grating is parallel to the second direction; the first width of the first edge is determined based on a width of the coupling-in grating in the first direction, a distance between the first edge and the center of the coupling-in grating and the first field-of-view angle.

Exemplarily, a width of the first edge is calculated from the following formula:

$$d = \tan(\beta) \times \left(c + \frac{a}{2}\right) + \varepsilon$$

wherein, d is the first width of the first edge; β is the first field-of-view angle; c is the distance between the first edge and the center of the coupling-in grating; a is the width of the coupling-in grating in the first direction; c is a constant ranging from 0 to 5 mm.

Exemplarily, the second width of the second edge is less than a difference between the first width of the first edge and the double of a third width, and the third width is defined as a length of the coupling-out grating in the second direction being divided by a tangent value of the first included angle.

Exemplarily, the first coupling-out grating and the third coupling-out grating each is a one-dimensional grating.

Exemplarily, a central axis of the coupling-in grating is parallel to the second direction; the first coupling-out grating is symmetric to the third coupling-out grating with respect to the central axis; the second coupling-out grating is symmetric with respect to the central axis.

Exemplarily, the second coupling-out grating comprises a plurality of sub-regions, the coupling-out gratings in different sub-regions have different two-dimensional periodic structures, or coupling-out gratings of at least two sub-regions of the plurality of the sub-regions have the same two-dimensional periodic structures.

Exemplarily, the second width of the second edge is greater than or equal to 0.

Exemplarily, the second coupling-out grating is located in a region that takes the shape of one of the following: an inverted trapezoid, a triangle, and a combination of an inverted trapezoid and a rectangular.

Exemplarily, a chamfer is disposed in the second coupling-out grating in its vicinity to the first edge; and/or a chamfer is disposed in the second coupling-out grating in its vicinity to the second edge.

Exemplarily, the coupling-out grating further comprises a fourth coupling-out grating and a fifth coupling-out grating, the fourth coupling-out grating is disposed between the first coupling-out grating and the second coupling-out grating, and the fifth coupling-out grating is disposed between the second coupling-out grating and the third coupling-out grating, wherein the fourth coupling-out grating is symmetric to the fifth coupling-out grating with respect to the central axis of the second coupling-out grating.

Exemplarily, the fourth coupling-out grating and the fifth coupling-out grating each comprises a plurality of grating lines; each of the grating lines comprises a plurality of periodic structures in continuous and connected arrangement; at least one edge of the periodic structures is a non-linear edge, and the shape of the non-linear edge is one of: a polyline, an arc, and a combination of a straight line and an arc.

Another aspect of the present invention further provides a display device, comprising the aforesaid diffractive optical waveguide.

Exemplarily, the display device is a near-eye display device, comprising:

a lens and a frame for holding the lens near eyes, the lens including the diffractive optical waveguide.

In the diffractive optical waveguide for optical pupil expansion according to the present invention, the second coupling-out grating is disposed between the first coupling-out grating and the third coupling-out grating and the width of the first edge of the second coupling-out grating is greater than the width of the second edge, in order to obtain a better effect of two-dimensional pupil expansion using the second coupling-out grating, meanwhile the coupling-out efficiency can be improved using the first coupling-out grating and the third coupling-out grating, so as to achieve the effect of higher uniformity between different regions being compatible with higher overall coupling-out efficiency. Therefore, it makes human eyes feel a more moderate change in brightness of light in different incident directions and brighter light in the field of view with wearing an optical waveguide display device, while avoiding a significant change in the brightness change of the image observed by the human eyes moving in the eye box of the diffractive optical waveguide. This improves the display effect of the display device having the diffractive optical waveguide, and thereby improves the user's experience.

Since the display device of the present invention comprises the aforementioned diffractive optical waveguide, it has substantially the same advantages as the diffractive optical waveguide.

BRIEF DESCRIPTION OF THE DRAWINGS

In order to illustrate the technical solutions in the embodiments of the present invention more clearly, the following briefly introduces the drawings that need to be used in the description of the embodiments. Apparently, the drawings described in the following are only some embodiments of the present invention. For those of ordinary skilled in the art, other drawings can also be obtained from these drawings without creative work.

DETAILED DESCRIPTION

In order to make the objectives, technical solutions and advantages of the present invention more apparent, the exemplary embodiments according to the present invention will be described in detail below with reference to the accompanying drawings. Apparently, the described embodiments are only a part of the embodiments of the present invention, rather than all the embodiments of the present invention, and it should be understood that the present invention is not limited by the example embodiments described herein. Based on the embodiments of the present invention described herein, all other embodiments obtained by those skilled in the art without creative work shall fall within the protection scope of the present invention.

In the following description, numerous specific details are set forth in order to provide a more thorough understanding of the present invention. However, it is obvious to those skilled in this art that the present invention may be implemented without one or more of these details. Some technical features well-known in this art are not described in other examples in order to avoid confusion with the present invention.

It is to be understood that the present invention can be implemented in various forms but should not be construed as being limited to the embodiments set forth herein. On the contrary, these embodiments are provided to make the disclosure thorough and complete and the scope of the application be completely delivered to those skilled in the art.

The use of the terms provided herein is intended merely to illuminate the embodiments and does not pose a limitation on the application. When they are used herein, the terms "a", "an" and "the" in the singular form are also intended to include the plural, unless otherwise indicated herein. It should still be understood that the terms "comprising" and/or "including" are used in the description to determine the presence of the features, integers, steps, operations, elements and/or components but not to exclude the presence or addition of one or more other features, integers, steps, operations, elements, components and/or groups. When they are used herein, the terms "and/or" include any or all combinations of related listed items.

In order to understand the present invention thoroughly, a detailed structure is provided in the following description so as to elucidate the technical solutions presented in the present invention. Alternative embodiments of the present invention are illustrated in detail as below. However, the present invention may further have other embodiments in addition to these detailed descriptions.

Figure 1:
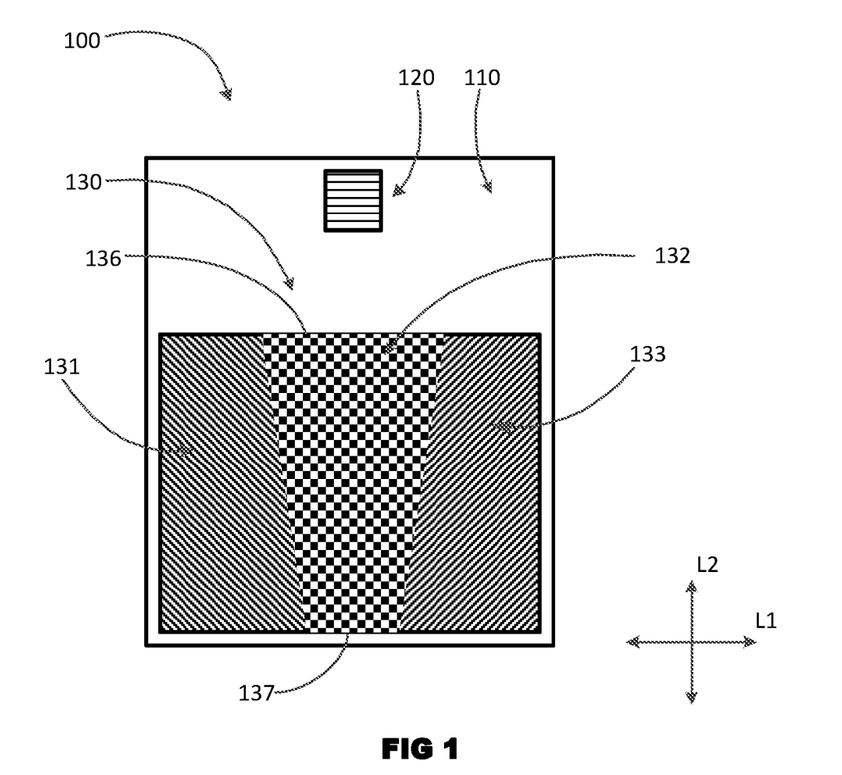
FIG. 1 shows a schematic diagram of a diffractive optical waveguide according to a preferred embodiment of the present invention.

In order to solve the aforementioned technical problem, the present invention provides a diffractive optical waveguide 100 for optical pupil expansion. FIG. 1 illustratively shows an example of the diffractive optical waveguide 100 for optical pupil expansion according to an embodiment of the present invention, namely the diffractive optical waveguide 100. As shown in FIG. 1, the diffractive optical waveguide 100 comprises a waveguide substrate 110. The waveguide substrate 110 can be made of glass, optical plastic, or other optical transmission materials.

Alternatively, the waveguide substrate 110 can have first and second substantially flat surfaces 111, 112, wherein the first surface 111 is opposite to the second surface 112, wherein the first surface 111 can be the surface of the display device with the waveguide substrate 110 on the side facing the viewer's eyes. With the waveguide substrate 110, light may propagate in a direction substantially parallel to the first surface 111 and the second surface 112 by total internal reflection.

Further, as shown in FIG. 1, the diffractive optical waveguide 100 of the present invention further comprises a coupling-in grating 120 and a coupling-out grating 130, wherein the coupling-in grating 120 is disposed on or in the waveguide substrate 110 and is configured to couple the input light into the waveguide substrate 110 to allow it to be coupled to the coupling-out grating 130 by total reflection.

The coupling-out grating 130 is disposed on or in the waveguide substrate 110 and is configured to couple input light out of the waveguide substrate 110 by diffraction to allow the viewer's eyes to receive the coupled-out light. When the light entering into the coupling-in grating 120 is, for example, the image light projected by a projector, the light coupled out of the coupling-out grating 130 is at least a portion of the image light, and the portion of the image light is guided to the viewer's eyes through the coupling-out grating 130, such that the image projected by the projector is visible to the viewer's eyes. Wherein, the coupling-out grating 130 serves as pupil expansion, which can refer to an input of a low field of view (FOV) being changed into an output of a high FOV.

Figure 2:
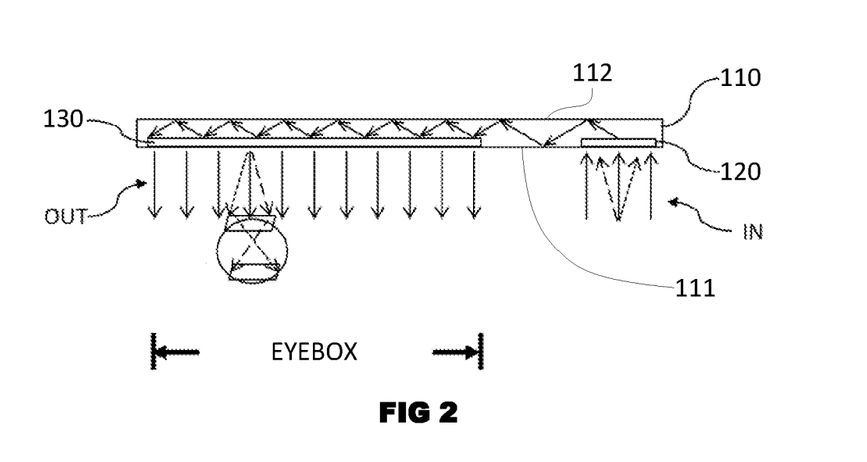
FIG. 2 shows a side view diagram of the diffractive optical waveguide according to a preferred embodiment of the present invention.

With reference to FIG. 2, the coupling-in grating 120 and the coupling-out grating 130 can be located on the same side of the waveguide substrate 110, for example, both are disposed on the first surface 111 of the waveguide substrate 110, or can be located on either side, i.e., on the first surface 111 and the second surface 112, respectively.

Alternatively, in some embodiments, the diffractive optical waveguide 100 can further comprise a turning grating, whereby light is coupled into the waveguide substrate 110 through the coupling-in grating 120 and into the turning grating through the waveguide substrate 110 by total reflection, and propagates through the turning grating in a first predetermined direction and then is coupled out of the coupling-out grating 130 in a second predetermined direction, wherein the first predetermined direction is different from the second predetermined direction.

In an example of the present invention, as shown in FIG. 2, the coupling-in grating 120 and the coupling-out grating 130 are located on the same side surface of the waveguide substrate 110. The coupling-in grating 120 can be a one-dimensional grating, such as a linear grating, or a slanted grating, a non-blazed grating, and other suitable types of gratings, or the coupling-in grating 120 can also be a metasurface coupling-in structure.

In some embodiments, the coupling-in grating 120 can also be implemented by some other optical devices having coupling function, such as a prism, a reflective polarizer, or a mirror with reflection function.

The coupling-in grating 120 can be an optical element including a periodic structure, which can be fabricated by any suitable microfabrication process. For example, the grating can be fabricated on the surface of or inside the waveguide substrate 110 by photolithography, or on the waveguide substrate 110 by nanoimprint lithography, thereby forming a surface relief diffraction grating.

The coupling-out grating 130 can comprise a first coupling-out region 131, a second coupling-out region 132 and a third coupling-out grating 133, which are all arranged successively in the first direction L1, wherein the second coupling-out region 132 may be disposed between the first coupling-out region 131 and the third coupling-out region 133.

Figure 12:
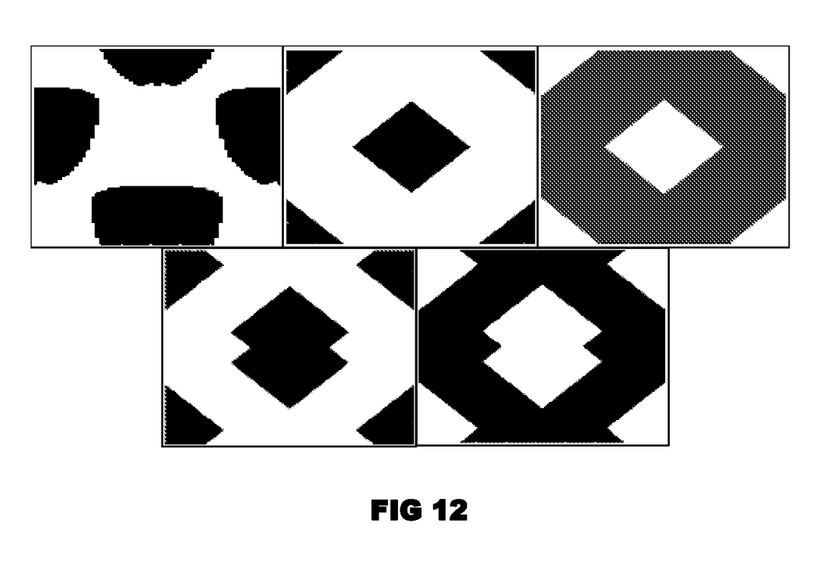
FIG. 12 shows a schematic diagram of the alternative periodic structures of the second coupling-out grating in the embodiment of FIG. 10 and FIG. 11.

At least one of the first coupling-out grating 131 and the third coupling-out grating 133 may be a one-dimensional grating structure. The second coupling-out grating 132 may be a two-dimensional grating structure. The two-dimensional grating structure comprises a plurality of two-dimensional periodic structures. The two-dimensional periodic structure of the two-dimensional grating can be in the shape of a polygon, such as a quadrilateral, a pentagon, a hexagon, and other polygons, etc., and may also be a triangle or Reuleaux Triangle, with reference to FIG. 12.

The second coupling-out grating 132 can be configured such that a minority of light into the second coupling-out grating 132 is coupled out of the waveguide substrate 110 toward the viewer's eyes, and the majority of the light into the second coupling-out grating 132 propagate by diffraction toward the region where the first coupling-out grating 131, the second coupling-out grating 132, and the third coupling-out grating 133 are located. Specifically, in the case where light is incident near the boundary between the first coupling-out grating 131/the third coupling-out grating 133 and the second coupling-out grating 132, most of the light will propagate by diffraction toward the region where the first coupling-out grating 131/the third coupling-out grating 133 is located. In the case where the light is incident on the central region of the second coupling-out grating 132, most of the light will propagate within the second coupling-out grating 132. The first coupling-out grating 131 and the third coupling-out grating 133 are configured such that a part of light out of the waveguide substrate 110 is coupled toward the viewer's eyes, and the other part of light can also propagate toward the second coupling-out grating 132 to at least fill light in the boundary areas between the second coupling-out grating 132 and the first coupling-out grating 131, as well as in the boundary areas between the second coupling-out grating 132 and the third coupling-out grating 133. In this way, it is possible to avoid the emergence of clear demarcation for bright and dark in the boundary areas.

The coupling-out grating 130 can be fabricated by any suitable microfabrication process. For example, the grating can be fabricated on the surface or inside of the waveguide substrate 110 by photolithography, or on the waveguide substrate 110 by nanoimprint lithography, thereby forming a surface relief diffraction grating.

Exemplarily, the central axis A1 of the coupling-in grating 120 is parallel to the second direction L2, wherein the second direction L2 is orthogonal to the first direction L1. Preferably, the first coupling-out grating 131 is symmetric to the third coupling-out grating 133 with respect to the central axis A1. Preferably, the second coupling-out grating 132 is also symmetric with respect to the central axis A1. It will be appreciated that in other embodiments, the first coupling-out grating 131 can be not symmetric to the third coupling-out grating 133, and the second coupling-out grating 132 can be in asymmetric shape.

Figure 3:
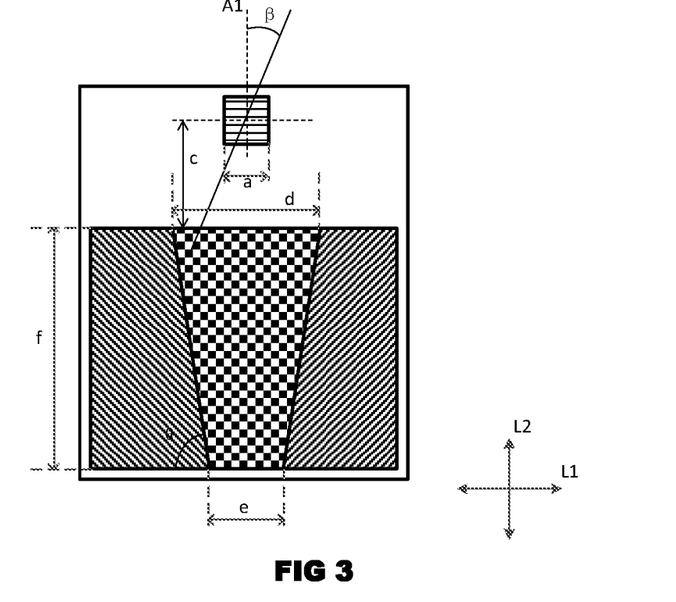
FIG. 3 shows a diagram indicating dimensions of the diffractive optical waveguide in FIG. 1.

In a preferred embodiment, as shown in FIG. 1 and FIG. 3, the second coupling-out grating 132 is corresponding to a region that includes a first edge 136 and a second edge 137 spaced in a second direction L2. Moreover, the first edge 136 is closer to the coupling-in grating 120 than the second edge 137. In other words, the second edge 137 is further away from the coupling-in grating 120 than the first edge 136.

Wherein, the first width of the first edge 136 in the first direction L1 is greater than a second width of the second edge 137 in the first direction L1. Preferably, the first width of the first edge 136 is configured so that an periphery field-of-view light in the field of view formed by the light output from the coupling-in grating 120 can be incident into the second coupling-out grating 132 through total reflection by the waveguide substrate 110.

According to the above settings, it is possible to obtain a good effect of two-dimensional pupil expansion using the second coupling-out grating 132, while the coupling-out efficiency can be improved using the first coupling-out grating 131 and the third coupling-out grating 133. Also, it is possible to avoid clear demarcation for bright and dark in boundary areas by filling light, so as to achieve the effect of higher uniformity between different regions being compatible with higher overall coupling-out efficiency.

Figure 6:
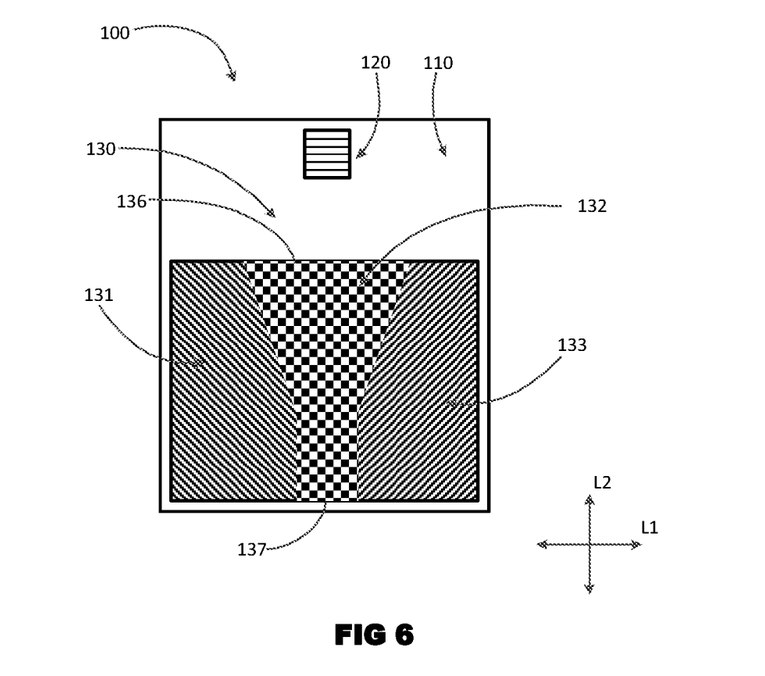
FIG. 6 shows a schematic diagram of the diffractive optical waveguide of another preferred embodiment of the present invention.
Figure 8:
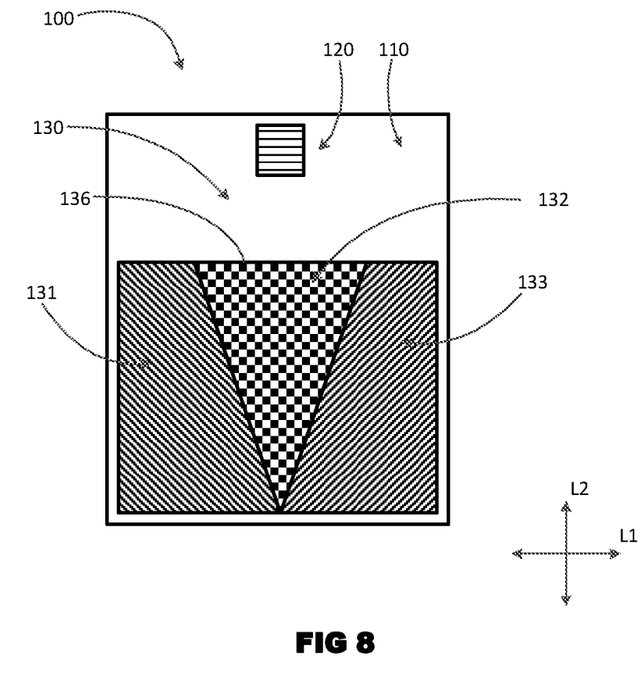
FIG. 8 shows a schematic diagram of the diffractive optical waveguide of yet another preferred embodiment of the present invention.

Alternatively, the second width of the second edge 137 is greater than or equal to 0. In an embodiment, when the second width of the second edge 137 is equal to 0, the second coupling-out grating 132 is located in a region generally shaped as a triangle (as shown in FIG. 8). In another embodiment, when the second width of the second edge 137 is greater than 0, the second coupling-out grating 132 is located in a region generally shaped as an inverted trapezoid (as shown in FIG. 1) or the combination of an inverted trapezoid and a rectangle (as shown in FIG. 6).

Figure 5:
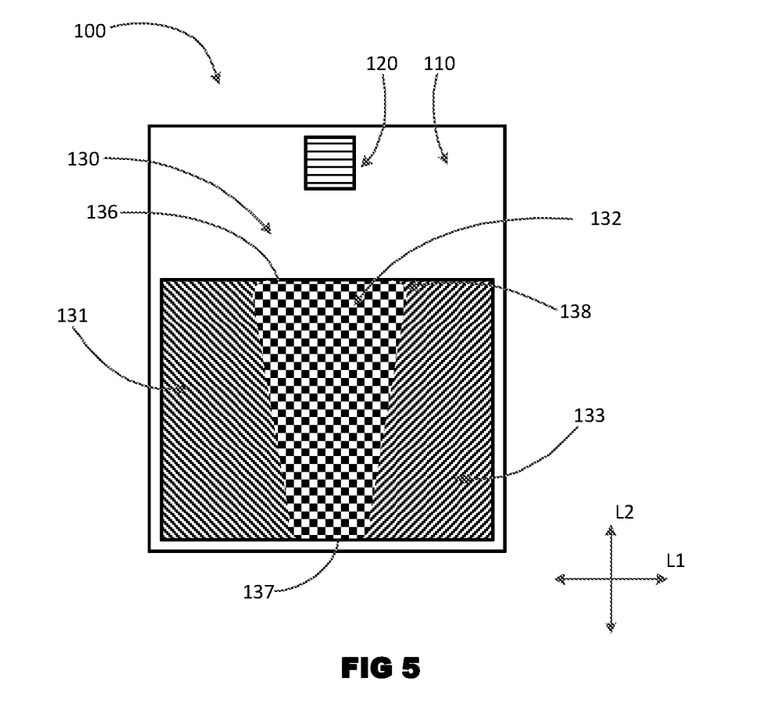
FIG. 5 shows a schematic diagram of modification of the diffractive optical waveguide in FIG. 1.
Figure 7:
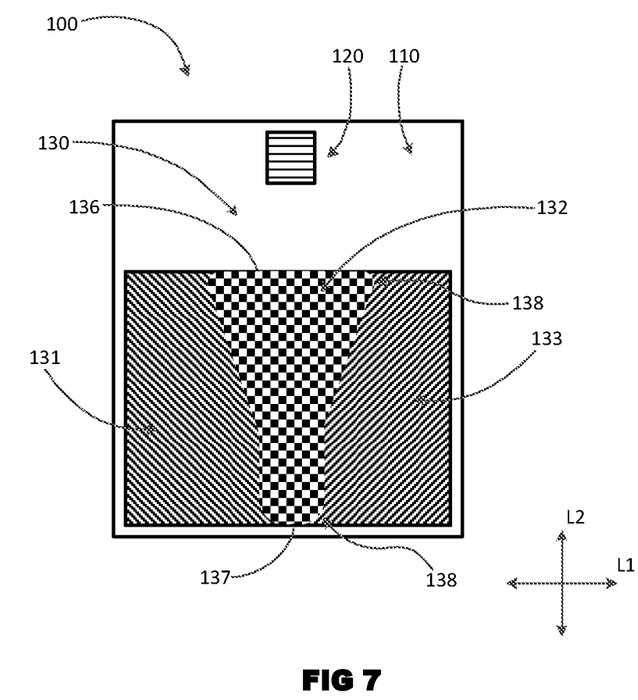
FIG. 7 shows a schematic diagram of modification of the diffractive optical waveguide in FIG. 6.
Figure 9:
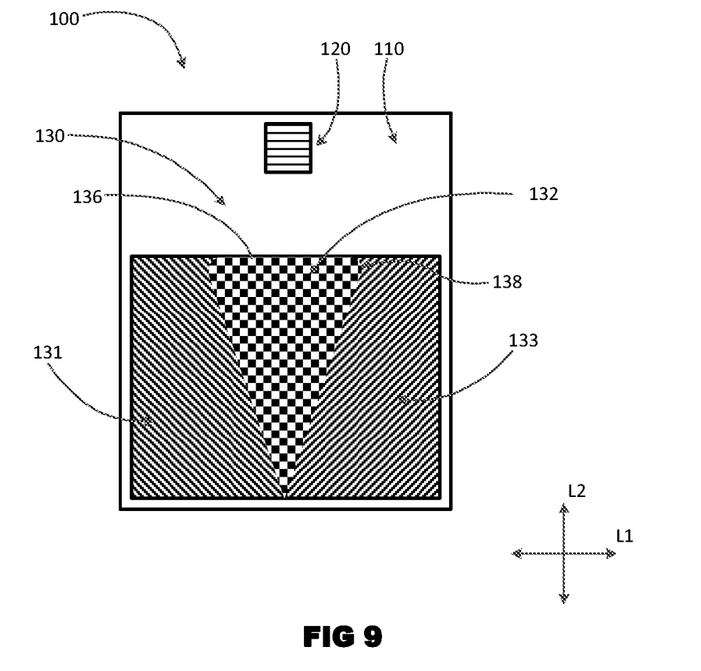
FIG. 9 shows a schematic diagram of modification of the diffractive optical waveguide in FIG. 8.

Alternatively, a chamfer 138 can be disposed in the second coupling-out grating 132 in its vicinity to the first edge 136 and in its vicinity to the second edge 137. For example, the structures shown with reference to FIGS. 5, 7, and 9 correspond to the modifications of embodiments in FIGS. 1, 6, and 8, respectively.

Figure 4:
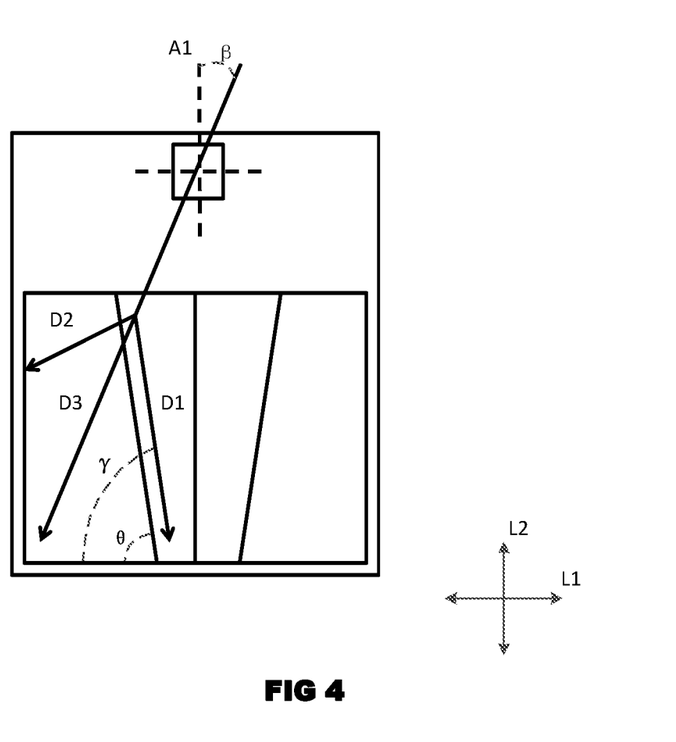
FIG. 4 shows a schematic diagram of directions of the beam splits in the embodiment of FIG. 1.

The propagation direction of light in the diffractive optical waveguide 100 of the present invention will be described below with reference to FIG. 4. When light is coupled into the waveguide substrate 110 by the coupling-in grating 120, the light incident into the second coupling-out grating 132 can be diffracted into a plurality of beam splits by the second coupling-out grating 132, for example, the first beam split D1, the second beam split D2, and the third beam split D3. Wherein, the first beam split D1 propagates in the region of the second coupling-out grating 132. The second beam split D2 propagates toward either the first coupling-out grating 131 or the third coupling-out grating 133, e.g., toward the first coupling-out grating 131 as depicted in the figure.

The third beam split D3 continues to propagate in the original direction, that is, the third beam split D3 propagates in the same direction as same as the propagation direction of the light output from the coupling-in grating 120. Therefore, the third beam split D3 can enter the first coupling-out grating 131 or the third coupling-out grating 133 in the original propagation direction.

Exemplarily, after the third beam split D3 enters the first coupling-out grating 131 in the original propagation direction, the third beam split D3 can be diffracted by the first coupling-out grating 131 into a first light component and a second light component. The first light component propagates in the first coupling-out grating 131 and is at least partially coupled out of the waveguide substrate 110, while the second light component propagates toward the second coupling-out grating 132 to fill light in the second coupling-out grating 132.

After the third beam split D3 enters the third coupling-out grating 133 in the original propagation direction, the third beam split D3 is diffracted by the third coupling-out grating 133 into a first light component and a second light component. In this case, the first light component propagates in the third coupling-out grating 133 and is at least partially coupled out of the waveguide substrate 110, and the second light component propagates toward the second coupling-out grating 132 for filling light in the second coupling-out grating 132. In this way, it is possible to allow the second light component of the third beam split D3 to propagate into the second coupling-out grating 132 for filling light and improving the uniformity between different regions, and to avoid the emergence of clear demarcation for bright and dark in the boundary areas of the second coupling-out grating 132 adjacent to the first coupling-out grating 131 and the boundary areas of the second coupling-out grating 132 adjacent to the third coupling-out grating 133.

Specifically, with reference to FIG. 3, a first field-of-view angle is defined as the included angle between the periphery field-of-view light and the central axis A1 of the coupling-in grating 120. In order for the light to propagate in the direction described above, the first width of the first edge 136 is determined depending on the width of the coupling-in grating 120 in the first direction L1, the distance between the first edge 136 and the center of the coupling-in grating 120, and the first field-of-view angle.

Exemplarily, the first width of the first edge 136 is calculated from the following formula:

$$d = \tan(\beta) \times \left(c + \frac{a}{2}\right) + \varepsilon$$

Wherein, d is the first width of the first edge 136; β is the first field-of-view angle; c is the distance between the first edge 136 and the center of the coupling-in grating 120; a is the width of the coupling-in grating 120 in the first direction L1; ε is a constant ranging from 0 to 5 mm, or may also be any suitable value between 0 to 3 mm, and further may also be any suitable value between 0 to 2 mm. The first width of the first edge 136 can also be adjusted by adjusting the value of ε. Thus, all of the light output by the coupling-in grating 120 can be incident into the second coupling-out grating 132 through the waveguide substrate 110.

In order to simultaneously further improve uniformity between different regions and coupling-out efficiency, it is necessary that at least most of the first beam split D1 can always propagate in the second coupling-out grating 132 and be coupled out of the second coupling-out grating 132. To this end, referring to FIG. 4, a first included angle θ is defined between the second edge 137 and the line connecting respective endpoints of the first edge 136 and the second edge 137 located on the same side with respect to the central axis A1 of the second coupling-out grating 132, and a second included angle γ is defined between the second edge 137 and the propagation direction of the first beam split D1. It is required to meet that the first included angle θ is greater than or equal to the second included angle γ, that is, θ≥γ. Taking the region of the second coupling-out grating 132 being shaped as an inverted trapezoid for example, the first included angle θ can be an acute angle formed by the leg of the inverted trapezoid and the straight line of the second edge 137.

Correspondingly, when the region of the second coupling-out grating 132 is not shaped as a triangle, or the width of the second edge 137 is not 0, the width of the second edge 137 should be able to satisfy the above relationship between the first included angle θ and the second included angle γ. As an example, taking the region of the second coupling-out grating 132 being shaped as an inverted trapezoid for example, with reference to FIG. 4, the third width is defined as the length of the coupling-out grating in the second direction L2 being divided by the tangent value of the first included angle θ, whereby the second width of the second edge 137 is required to be less than the difference between the first width of the first edge 136 and the double of the third width.

Using f to indicate the length of the coupling-out grating 130 in the second direction L2 and e to indicate the second width of the second edge 137, a formula regarding e is established to satisfy:

$$e \leq d - 2f/\tan(\theta)$$

Figure 10:
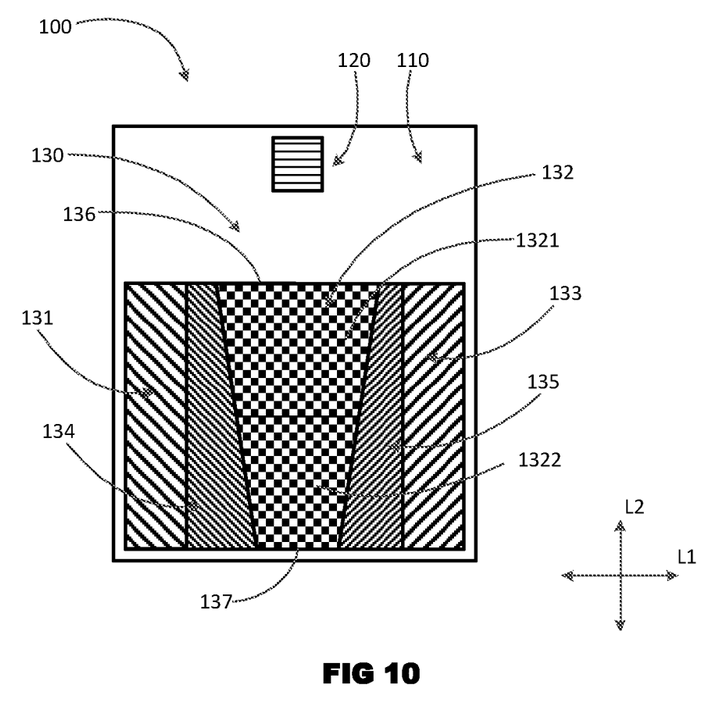
FIG. 10 shows a schematic diagram of the diffractive optical waveguide of still another preferred embodiment of the present invention.
Figure 11:
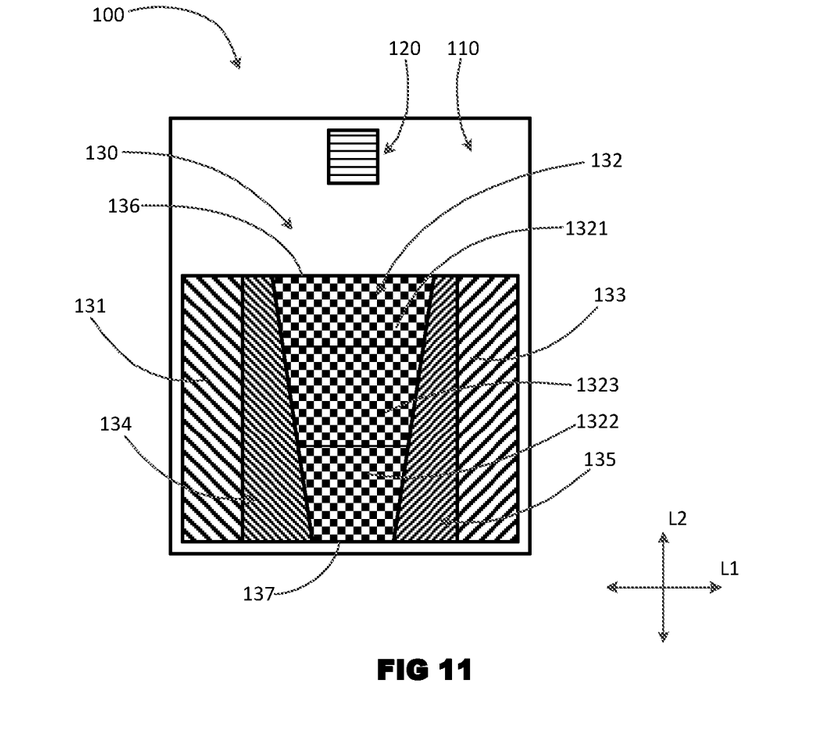
FIG. 11 shows a schematic diagram of modification of the diffractive optical waveguide in FIG. 10.

For better visual effect, the coupling-out grating 130 can further include the fourth coupling-out grating 134 and the fifth coupling-out grating 135, referring to FIG. 10 and FIG. 11. The fourth coupling-out grating 134 is disposed between the first coupling-out grating 131 and the second coupling-out grating 132, and the fifth coupling-out grating 135 is disposed between the second coupling-out grating 132 and the third coupling-out grating 133. Preferably, the fourth coupling-out grating 134 is symmetric to the fifth coupling-out grating 135 with respect to the central axis A1 of the second coupling-out grating 132.

Figure 13:
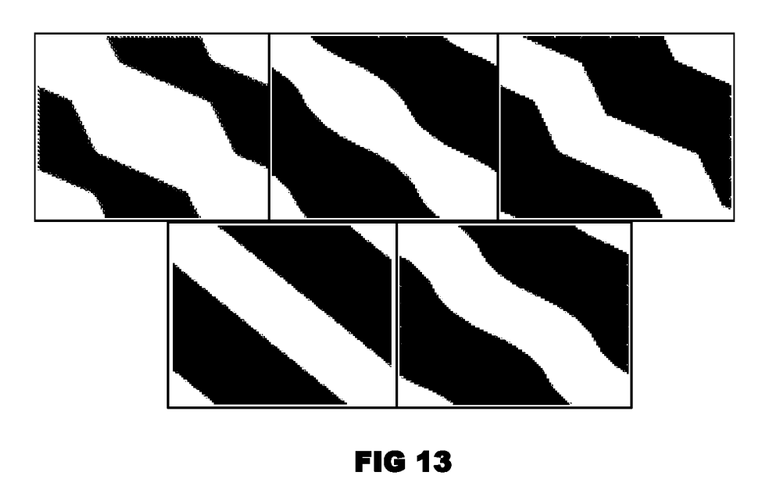
FIG. 13 shows a schematic diagram of the alternative periodic structures of the first coupling-out grating, the third coupling-out grating, the fourth coupling-out grating, and the fifth coupling-out grating of the embodiment of FIG. 10 and FIG. 11.

The fourth and fifth coupling-out gratings 134 and 135 each can include a plurality of grating lines. For example, the fourth and fifth coupling-out gratings 134 and 135 each can be a one-dimensional grating different from the first coupling-out grating 131 and the third coupling-out grating 133. That is, the above grating lines can be constructed as linear structure as shown in FIG. 13; or the fourth coupling-out grating 134 and the fifth coupling-out grating 135 can also be two-dimensional gratings tending to be like one-dimensional gratings, so as to avoid sudden optical change generated between one-dimensional and two-dimensional regions.

Preferably, each of the grating lines comprises a plurality of periodic structures in continuous and connected arrangement. At least one side edge of the periodic structures is a non-linear side edge. In some examples, the shape of the non-linear side edge is one of a polyline, an arc, a combination of a straight line and an arc, and any other suitable shape structures. Wherein, the polyline shape can have one or more bends; the arc shape can be in the form of an arc or several arcs connected one by one; the combination of the straight line and arc can also be in the form of a straight line connected with an arc, or several straight lines and an arc connected one by one, or several straight lines and several arcs connected one by one. Wherein, the bend angle of polyline-shaped non-linear side edge and the curving radian of arc-shaped non-linear side edge can be adjusted depending on actual needs, and are not specifically limited here. Exemplarily, the periodic structure of the grating lines may be freely selected from the structure shown in FIG. 13, which are not limited here.

In order to further obtain better diffraction optimization, the second coupling-out grating 132 includes multiple sub-regions. As shown in FIG. 10, the second coupling-out grating 132 includes the first sub-region 1321 and the second sub-region 1322 arranged in the second direction L2. The second coupling-out grating 132 as shown in FIG. 11 includes three sub-regions, namely the first sub-region 1321, the third sub-region 1323, and the second sub-region 1322 arranged in the second direction L2.

Moreover, different sub-regions of the second coupling-out grating 132 have different two-dimensional periodic structures. Exemplarily, the first sub-region 1321 and the second sub-region 1322 in FIG. 10 have respective, different two-dimensional periodic structures. The first sub-region 1321, the second sub-region 1322, and the third sub-region 1323 as shown in FIG. 11 have respective, different two-dimensional periodic structures.

Alternatively, at least two sub-regions of the multiple sub-regions have the same shape. For example, the first sub-region 1321 and the second sub-region 1322 as shown in FIG. can adopt the same two-dimensional periodic structure. The first sub-region 1321 and the second sub-region 1322 as shown in FIG. 11 can adopt the same two-dimensional periodic structure, while the third sub-region 1323 can be different.

Furthermore, the present invention also provides a display device 800, which may comprise the aforementioned diffractive optical waveguide 100, wherein the description of the diffractive optical waveguide 100 can be referenced from the above and will not be repeated here.

The display device 800 can be any device comprising the aforementioned diffractive optical waveguide 100. As shown in FIG. 8, for example, the display device 800 can be a near-eye display device, which may comprise a lens 820 and a frame 810 for holding the lens near eyes, the lens 820 including the diffractive optical waveguide 100.

Figure 14:
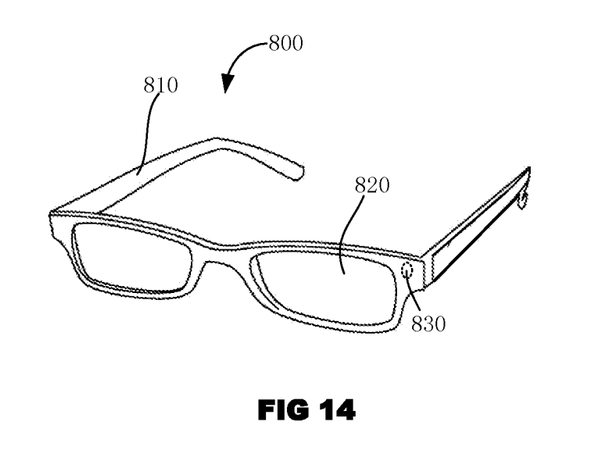
FIG. 14 shows a schematic diagram of an exemplary display device.

In some examples, as shown in FIG. 14, the display device 800 may further comprise an optical source 830. Alternatively, the optical source 830 can project image light onto the diffractive optical waveguide 100, e.g., into the area where the coupling-in grating 120 of the diffractive optical waveguide 100 is located. Wherein, the optical source 830 can be micro displays, such as a laser beam scanning (LBS), a digital light procession (DLP), a digital micromirror device (DMD), a liquid crystal on silicon (LCOS), a micro electromechanical system (MEMS), an organic light emitting diode (OLED), or the like. The light emitted by the optical source 830 is visible light.

The light (e.g., image light) projected by the optical source 830 onto the diffractive optical waveguide 100 is coupled into the waveguide substrate 110 through the coupling-in grating 120 and to the coupling-out grating 130 by totally reflection. The light is coupled out of the coupling-out grating 130 and comes into the eyes of viewer wearing the near-eye device, such that the image projected by the optical source 830 is visible to the viewer's eyes. In the diffractive optical waveguide 100 for optical pupil expansion, with the second coupling-out grating 132 being disposed between the first coupling-out grating 131 and the third coupling-out grating 133, and the width of the first edge 136 of the second coupling-out grating 132 being greater than the width of the second edge 137, it is possible to obtain a better effect of two-dimensional pupil expansion using the second coupling-out grating 132, while the coupling-out efficiency can be improved using the first coupling-out grating 131 and the third coupling-out grating 133, so as to achieve the effect of higher uniformity between different regions being compatible with higher overall coupling-out efficiency. Therefore, it makes human eyes feel a more moderate change in brightness of light in different incident directions and brighter light in the field of view with wearing an optical waveguide display device, while avoiding a significant change in the brightness change of the image observed by the human eyes moving in the eye box of the diffractive optical waveguide 100. This improves the display effect of the display device having the diffractive optical waveguide 100, and thereby improves the user's experience.

In some embodiments, the display device 800 is an augmented reality display device or a virtual reality display device, wherein the augmented reality display device includes but is not limited to the devices such as augmented reality (AR) glasses, an automotive head-up display (HUD), or the like.

It should be noted that the above-described embodiments are intended to illustrate but not limit the application, and alternative embodiments can be devised by those skilled in the art without departing from the scope of the appended claims. In the claims, any reference signs in parentheses shall not be construed as limiting the claim. The application can be implemented by means of hardware comprising several different elements as well as by means of a suitably programmed computer. In a unit claim listing several devices, some of these devices can be presented by the same one of hardware. The use of the words, such as first, second, and third, does not denote any order. These words can be interpreted as terms.

The invention claimed is:

1. A diffractive optical waveguide for optical pupil expansion, comprising:
   a waveguide substrate;
   a coupling-in grating disposed on or in the waveguide substrate and configured to couple input light into the waveguide substrate to cause light to propagate within the waveguide substrate through total reflection;
   a coupling-out grating disposed on or in the waveguide substrate and configured to couple out at least a portion of light propagating therein from the waveguide substrate by diffraction, wherein,
   the coupling-out grating comprises a first coupling-out grating, a second coupling-out grating and a third coupling-out grating, all of which are arranged successively in a first direction; the second coupling-out grating is disposed between the first coupling-out grating and the third coupling-out grating, and comprises a two-dimensional grating; the second coupling-out grating is corresponding to a region that includes a first edge and a second edge spaced in a second direction orthogonal to the first direction, wherein the first edge is closer to the coupling-in grating than the second edge, and a first width of the first edge in the first direction is greater than a second width of the second edge in the first direction; light output by the coupling-in grating is incident on the second coupling-out grating through the waveguide substrate, and is diffracted by the second coupling-out grating into a plurality of beam splits, the plurality of beam splits include a first beam split propagating within the region of the second coupling-out grating, a second beam split propagating toward the first coupling-out grating or the third coupling-out grating, and a third beam split propagating in the same direction as the propagation direction of light output by the coupling-in grating, and the third beam split is propagable to the first coupling-out grating or the third coupling-out grating.

2. The diffractive optical waveguide of claim 1, wherein the coupling-in grating has a central axis parallel to the second direction; a first included angle is defined between the second edge and a line connecting respective endpoints of the first edge and the second edge of the second coupling-out grating on the same side of the central axis; and a second included angle is defined between the second edge and the propagation direction of the first beam split, wherein the first included angle is greater than or equal to the second included angle.

3. The diffractive optical waveguide of claim 1, wherein the third beam split is diffracted into a first light component and a second light component by the first coupling-out grating, wherein the first light component propagates in the first coupling-out grating and is at least partially coupled out of the waveguide substrate, and the second light component propagates toward the second coupling-out grating for filling light; or
the third beam split is diffracted into a first light component and a second light component by the third coupling-out grating, wherein the first light component propagates in the third coupling-out grating and is at least partially coupled out of the waveguide substrate, and the second light component propagates toward the second coupling-out grating for filling light.

4. The diffractive optical waveguide of claim 1, wherein the first width of the first edge is configured so that periphery field-of-view light in the field of view formed by the light output from the coupling-in grating is able to be incident into the second coupling-out grating through total reflection by the waveguide substrate.

5. The diffractive optical waveguide of claim 4, wherein a first field-of-view angle is defined as an included angle between the periphery field-of-view light and the central axis of the coupling-in grating, and the central axis of the coupling-in grating is parallel to the second direction; the first width of the first edge is determined based on a width of the coupling-in grating in the first direction, a distance between the first edge and a center of the coupling-in grating, and the first field-of-view angle.

6. The diffractive optical waveguide of claim 5, wherein the first width of the first edge is calculated from the following formula:

$$d = \tan(\beta) \times \left(c + \frac{a}{2}\right) + \varepsilon$$

wherein, d is the first width of the first edge; $\beta$ is the first field-of-view angle; c is the distance between the first edge and the center of the coupling-in grating; a is the width of the coupling-in grating in the first direction; $\varepsilon$ is a constant ranging from 0 to 5 mm.

7. The diffractive optical waveguide of claim 2, wherein the second width of the second edge is less than a difference between the first width of the first edge and the double of a third width, and the third width is defined as a length of the coupling-out grating in the second direction being divided by a tangent value of the first included angle.

8. The diffractive optical waveguide of claim 1, wherein the first coupling-out grating and the third coupling-out grating each is a one-dimensional grating.

9. The diffractive optical waveguide of claim 1, wherein a central axis of the coupling-in grating is parallel to the second direction; the first coupling-out grating is symmetrical to the third coupling-out grating with respect to the central axis; and the second coupling-out grating is symmetric with respect to the central axis.

10. The diffractive optical waveguide of claim 1, wherein the second coupling-out grating comprises a plurality of sub-regions, coupling-out gratings in different sub-regions have different two-dimensional periodic structures; or
coupling-out gratings of at least two sub-regions of the plurality of the sub-regions have same two-dimensional periodic structures.

11. The diffractive optical waveguide of claim 1, wherein the second width of the second edge is greater than or equal to 0.

12. The diffractive optical waveguide of claim 1, wherein the second coupling-out grating is located in a region that takes the shape of one of the following: an inverted trapezoid, a triangle, and a combination of an inverted trapezoid and a rectangular.

13. The diffractive optical waveguide of claim 1, wherein a chamfer is disposed in the second coupling-out grating in its vicinity to the first edge; and/or a chamfer is disposed in the second coupling-out grating in its vicinity to the second edge.

14. The diffractive optical waveguide of claim 1, wherein the coupling-out grating further comprises a fourth coupling-out grating and a fifth coupling-out grating, the fourth coupling-out grating is disposed between the first coupling-out grating and the second coupling-out grating, and the fifth coupling-out grating is disposed between the second coupling-out grating and the third coupling-out grating, wherein the fourth coupling-out grating is symmetric to the fifth coupling-out grating with respect to a central axis of the second coupling-out grating.

15. The diffractive optical waveguide of claim 14, wherein the fourth coupling-out grating and the fifth coupling-out grating each comprises a plurality of grating lines; each of the grating lines comprises a plurality of periodic structures in continuous and connected arrangement; at least one edge of the periodic structures is a non-linear edge, and the shape of the non-linear edge is one of: a polyline, an arc, and a combination of a straight line and an arc.

16. A display device, comprising the diffractive optical waveguide of claim 1.

17. The display device of claim 16, wherein the display device is a near-eye display device, comprising a lens and a frame for holding the lens near eyes, the lens including the diffractive optical waveguide.

* * * * *